(No Model.)
E. E. ROSS.
NUT LOCK.
No. 286,849. Patented Oct. 16, 1883.
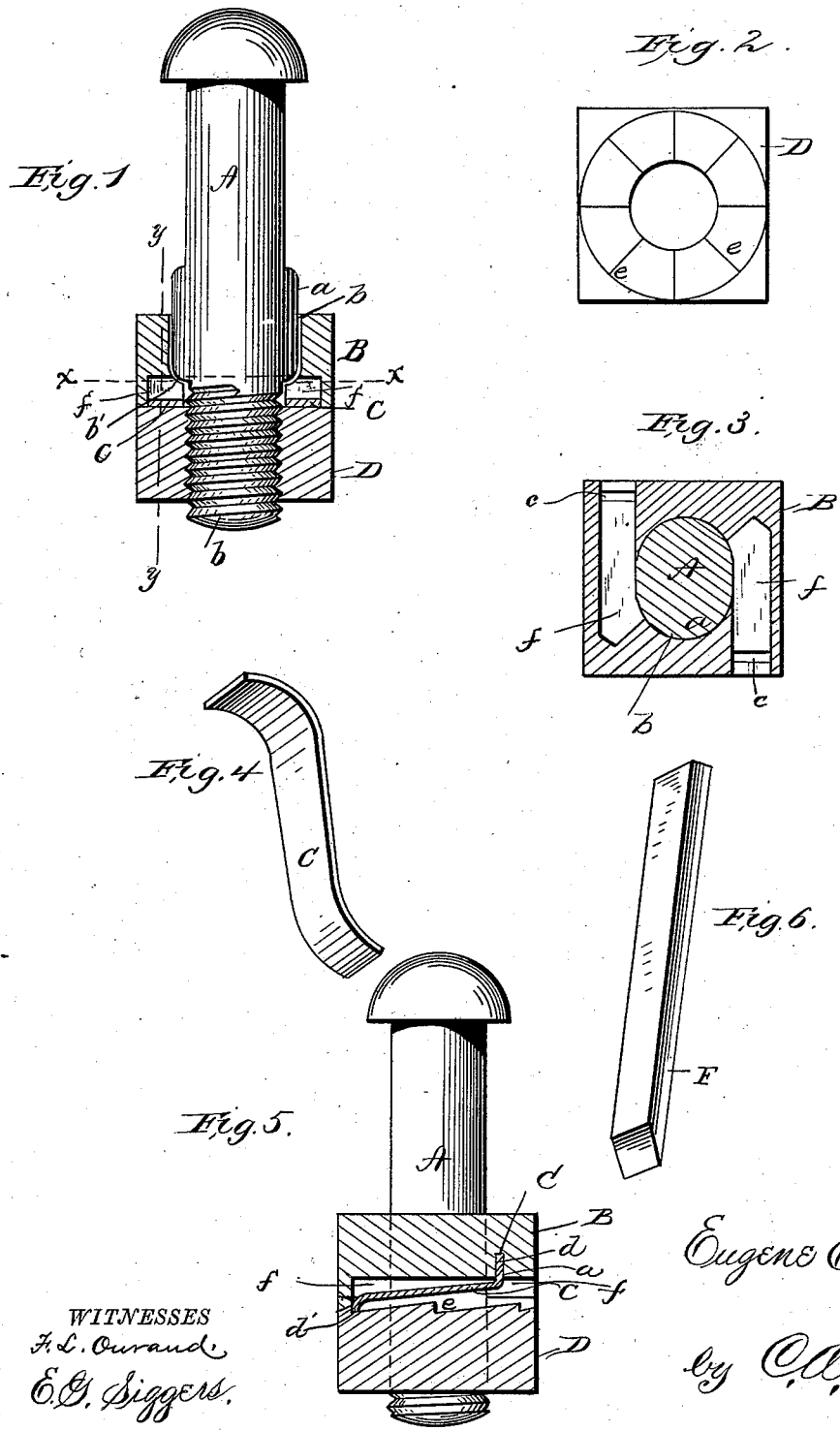

UNITED STATES PATENT OFFICE.

EUGENE E. ROSS, OF LYNCHBURG, VIRGINIA.

NUT-LOCK.

SPECIFICATION forming part of Letters Patent No. 286,849, dated October 16, 1883.

Application filed September 1, 1883. (No model.)

*To all whom it may concern:*

Be it known that I, EUGENE E. ROSS, a citizen of the United States, residing at Lynchburg, in the county of Campbell and State of Virginia, have invented a new and useful Nut-Lock, of which the following is a specification, reference being had to the accompanying drawings.

This invention relates to nut-locks, and especially to that class of the same in which the washer is provided with spring-plates to engage with teeth on the inner face of the nut; and it consists in certain details of construction and combination of parts, whereby I attain superior advantages in point of simplicity, durability, and general efficiency.

In the accompanying drawings, Figure 1 is a longitudinal vertical section through a bolt, showing the application of my improved devices. Fig. 2 is a plan view of the nut. Fig. 3 is a transverse section of the washer on the line $x\,x$, Fig. 1. Fig. 4 is a detail view of one of the spring-plates. Fig. 5 is a section on the line $y\,y$, Fig. 1; and Fig. 6 is a detail view of the key for loosening the nut-lock.

Like letters refer to corresponding parts in all the figures.

Referring to the drawings, A designates the bolt, having a swell, $a$, formed therewith just above the screw-threaded end $b$, a washer, B, fitting over one end of the swelled portion, said washer being formed with an opening, $b$, to adapt it to fit around said swell, so that when the washer is pressed inward by the operation of the nut D it will bind tightly around the swelled portion of the bolt, and thus the parts will be held from turning.

C C designate two spring-plates curved in opposite directions at their ends, one end, $d'$, being arranged to form a shank, the shanks of the spring-plates being fitted within slots formed in the washer, the main portion of the plates working in a recessed portion, $f$, of the washer, while the upper ends or points engage with ratchet-teeth $e$, formed on the inner face of the nut E.

It will be seen that the plates C C are arranged on opposite sides of the washer, and each works in a recess, $f$, so that the points engage with the ratchet-teeth when the nut is worked in the course of tightening the nut-lock. The fitting of the shanks in separate slots and recesses of the washer prevents the spring-plates from getting out of order, and when it is desired to unloosen the nut D a key, F, (shown in Fig. 6,) is inserted through the slot or recess $f$, formed in the washer, and by depressing the pointed end of the spring-plates they are disengaged from the ratchet-teeth of the nut, and thus the nut is released and can be taken off along with the washer.

The operation of my invention is obvious, and need not be particularly recited here. The advantages are also apparent, since the spring-plates will readily and firmly bear against the ratchet-teeth of the nut and hold the same from turning. The securing of the plates and the peculiar shape of the same afford sufficient elastic force to secure the parts together, while the end of the plates can be readily depressed in order to loosen the nut. The swelled portion of the bolt will effectually co-operate to hold the washer from slipping or turning in any manner, and thus add to the efficiency of the lock.

Having described my invention, I claim as my own—

1. In a nut-lock, the bolt provided with a swell above the screw-threaded end, in combination with the washer, formed with an opening to fit around the lower end of said swell, for the purpose set forth.

2. In a nut-lock, the combination, with the bolt and washer, relatively constructed as described, and the ratchet-nut, of recesses $f$, formed in the washer and extending in an outward direction through its opposite sides, spring-plates working in the recesses and curved in opposite directions at their ends, the lower end or shank fitting in a slot, $c$, while the upper end engages with teeth formed on the inner face of the said ratchet-nut, as and for the purpose set forth.

In testimony that I claim the foregoing as my own I have hereto affixed my signature in presence of two witnesses.

EUGENE E. ROSS.

Witnesses:
WM. BAGGER,
EDWARD G. SIGGERS.